United States Patent
An et al.

(10) Patent No.: US 11,274,047 B2
(45) Date of Patent: Mar. 15, 2022

(54) METHOD OF INHIBITING EXTRACTANT DEGRADATION BY CONTROLLING EXTRACTIVE CAPACITY AND PREVENTING DIRECT DEGRADATION

(71) Applicant: KOREA RESOURCES CORPORATION, Wonju-si (KR)

(72) Inventors: Jeon Woong An, Wonju-si (KR); Youn Kyu Yi, Wonju-si (KR); Gwang Seop Lee, Wonju-si (KR); Young Hun Kim, Gwangmyeong-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 377 days.

(21) Appl. No.: 16/523,408

(22) Filed: Jul. 26, 2019

(65) Prior Publication Data

US 2021/0024369 A1    Jan. 28, 2021

(51) Int. Cl.
| | |
|---|---|
| *C01G 51/00* | (2006.01) |
| *C22B 19/20* | (2006.01) |
| *C22B 3/00* | (2006.01) |
| *C01G 9/00* | (2006.01) |

(52) U.S. Cl.
CPC ........... *C01G 51/003* (2013.01); *C01G 9/003* (2013.01); *C22B 19/20* (2013.01); *C22B 23/0461* (2013.01)

(58) Field of Classification Search
CPC ...... C01G 51/003; C01G 9/003; C22B 19/20; C22B 23/0461
USPC ........................................................... 423/99
See application file for complete search history.

(56) References Cited

U.S. PATENT DOCUMENTS 7,935,322 B2 * 5/2011 Cheng ................. C22B 23/0461
423/139

\* cited by examiner

*Primary Examiner* — Steven J Bos
(74) *Attorney, Agent, or Firm* — Cantor Colburn LLP

(57) ABSTRACT

Provided is a method for inhibiting extractant degradation comprising preparing step, extracting step and scrubbing step, the method including: (a) the preparing step of a DSX solvent by adjusting the extractant concentration of the DSX solvent to a specific range; (b) the extracting step of metal included in the feed solution by adjusting the ratio of the organic (solvent) and an aqueous (solution) as a feed solution; (c) the scrubbing step of adjusting the zinc concentration of the solution using zinc sulfate; and (d) stripping step.

6 Claims, 3 Drawing Sheets

(a) Preparing a DSX solvent by adjusting the extractant concentration of the DSX solvent to a specific range;

(b) Extracting metal included in the feed solution by adjusting the ratio of the organic (solvent) and an aqueous (solution) as a feed solution;

(c) Scrubbing by adjusting the zinc concentration of the solution using zinc sulfate (d) Stripping

METHOD OF INHIBITING EXTRACTANT DEGRADATION BY CONTROLLING EXTRACTIVE CAPACITY AND PREVENTING DIRECT DEGRADATION

BACKGROUND OF THE INVENTION

1. Field of the Invention

The present invention relates to a method for inhibiting the extractant degradation, and more particularly, a method of inhibiting the extractant degradation by controlling the extractive capacity and preventing the direct degradation in Boleo cobalt/zinc solvent extraction (synergistic solvent extraction, hereinafter referred to as "DSX").

2. Description of the Related Art

The cobalt/zinc solvent extraction process (DSX process) is a process for simultaneously extracting cobalt (Co) and zinc (Zn) using two solvents. In order to increase the extraction rate, soda ash ($Na_2CO_3$) is added to adjust the optimum pH.

The higher the pH adjusted by the above-mentioned method, the higher the extraction rate of cobalt (Co) and zinc (Zn) to be recovered. However, the extraction rate of manganese, cadmium and copper ions acting as impurities becomes higher as well.

The manganese extracted by the above-mentioned method is the leading cause of the oxime degradation, which is an extractant, and the high manganese extraction causes the degradation of the extractant in the DSX process.

When the extractant is decomposed by the above-mentioned method, the extracted impurities (cobalt, zinc, manganese, cadmium, copper ions, and the like) overload the extraction capacity of the oxime in extractants, which increases the mol total metal/mol oxime to accelerate the degradation of extractants.

When the degradation of the extractant is accelerated by the above-mentioned method, the extraction capacity of the oxime in the process is decreased, thereby reducing the extraction rate of cobalt and zinc to be recovered.

If the extraction rate is lowered by the above-mentioned method when operating the process, it tends to increase a pH higher than the optimum pH for increasing the extraction rate. However, this accelerates the degradation of the extractant.

When the extraction rate is lowered, the extractant needs to be continuously supplied in an amount equal to or greater than the decomposed amount. The degradation of the extractant is accelerated, thereby requiring an additional feed of an enormous amount of extractant. If this deteriorates further, the degradation of the extractant cannot be reversed, and the DSX process must be stopped. If the DSX process is re-operated, it will incur enormous economic losses because all the solvents (all the decomposed extractants) input into the DSX process are removed and re-input into the DSX process.

The DSX process consists of a total of six steps, including two steps of extracting, two steps of scrubbing, and two steps of stripping. In the extracting step, the optimum extraction pH of cobalt/zinc is adjusted with soda ash ($Na_2CO_3$), and the metal included in the feed solution is extracted with a solvent. Since manganese, which is an impurity, is included in the metal-extracted solvent, manganese is required to be removed in the scrubbing step. In the scrubbing step, the solution with the concentration of zinc controlled is fed and reacted with the manganese-contained solvent. Thus, the zinc is extracted to the solvent by the substitution reaction, and the manganese is stripped to the solution. Further, in the stripping step, the manganese-removed solvent and the sulfuric acid ($H_2SO_4$) concentration-controlled feed solution are reacted, and the metal ions extracted into the solvent are all stripped and concentrated in the solution.

In order to prevent carbonization and degradation of the solvent by local contact with the solvent during the addition of the sulfuric acid and the soda ash, various methods are introduced during the addition.

In general solvent extraction, solvent/solution ratio (organic/aqueous ratio, O/A ratio) is adjusted to control entrainment and crud during operation. In order to control the solution entrainment by adjusting the O/A ratio, the aqueous continuous phase can be maintained to minimize the solution entrained in the solvent. Conversely, to control entrainment of the solvent, an organic continuous phase can be maintained to control the migration of the solvent entrained in the solution. This procedure should be determined by the situation of the operation and maintained appropriately according to the situation.

For example, in order to control the entrainment of the washing solution in the washing step of copper solvent extraction, the aqueous continuous phase is maintained, which is to control the impurity chlorine (Cl) included in the washing solution. When the chlorine (Cl) of the washing solution passes to the stripping step, it is concentrated in the electrolytic solution, and thus the electrode plate is corroded during the electrowinning to worsen the lifetime and exfoliation ability of the electrode plate.

For example, in the stripping step of the copper solvent extraction, the aqueous continuous phase may be maintained to reduce the loss of the stripping solution to the extraction step. However, when the aqueous continuous phase is maintained, sulfur (S) and iron (Fe) included in the solvent act as an impurity in the quality of the copper product while the solvent passes to the electrolyte. Further, the solvent passed to the electrolytic solution is oxidized and decomposed during the electrolysis, resulting in loss of the solvent.

Further, when the organic continuous phase is maintained in the stripping step, the loss of solvent in the electrolyte can be minimized, but the stripping solution passes to the extracting step to reduce the pH of the extracting step. When the physical entrainment is controlled to adjust continuous phase, various factors must be considered, for example, the size of the settler in each solvent extraction step, the volume of the total solvent, and the use of the scavenger cell.

However, the DSX process cannot be operated with the same technique as conventional solvent extraction. It is necessary to chemically control the change of the mol total metal/mol oxime in the extractant while controlling the physical entrainment, and it is preferable to fix it as an organic continuous phase in the extracting step.

For example, when the aqueous continuous phase is maintained to control the entrainment of the solution during the extracting step of the DSX process, the mol total metal/mol oxime of the extractant will be higher depending on the concentration of the feed solution, resulting in the extractant degradation.

For example, when the organic continuous phase is maintained to control the entrainment of the solvent during the stripping step of the DSX process, the cobalt and zinc concentrate is transferred to the extracting step. This is why the mol total metal/mol oxime of the extractant becomes high during the extraction, resulting in the extractant degradation.

For example, as illustrated in FIG. 3, when the process goes to the stripping step due to the solution entrainment in the scrubbing step of the DSX process, the impurity manganese (Mn) content becomes high in the concentrate, and the manganese (Mn) is concentrated in the back end process, resulting in corrosion on the electrode plate of the cobalt electrowinning.

Further, when the concentrate is bled off as in general solvent extraction when the scrubbing solution is fed in the scrubbing step of the DSX process, the mol total metal/mol oxime of the extractant becomes higher, and it influences degradation of the extractant as described above. Thus, it is difficult to operate (Ile with the same technique as the general solvent extraction.

SUMMARY OF THE INVENTION

In order to solve the above-mentioned problems, an object of the present invention is to provide a novel method of inhibiting the extractant degradation by controlling the extractive capacity and preventing the direct degradation in Boleo cobalt/zinc solvent extraction (DSX).

In order to solve the above-mentioned problems, the present invention provides a method for inhibiting extractant degradation comprising preparing step, extracting step and scrubbing step, the method including: (a) the preparing step of a DSX solvent by adjusting the extractant concentration of the DSX solvent to a specific range; (b) the extracting step of metal included in the feed solution by adjusting the ratio of the organic (solvent) and an aqueous (solution) as a feed solution; (c) the scrubbing step of adjusting the zinc concentration of the solution using zinc sulfate; and (d) stripping step.

Further, the present invention provides a method for inhibiting extractant degradation, wherein in step (a), soda ash is added to a sparger to adjust the pH of the solution, and in steps (c) and (d), sulfuric acid is added to a standpipe to adjust the sulfuric acid concentration of the solution.

Further, the present invention provides a method for inhibiting extractant degradation, wherein the DSX solvent in step (a) includes an oxime-based extractant and a neodecanoic acid-based extractant in addition to kerosene, a diluent, and the concentration of the oxime-based extractant is 0.5 v/v % to 6 v/v %.

Further, the present invention provides a method for inhibiting extractant degradation, wherein a volume ratio of the oxime-based extractant and the neodecanoic acid-based extractant is 1:0.5 to 4.

Further, the present invention provides a method for inhibiting extractant degradation, wherein in step (b), a volume ratio of the DSX aqueous (solution) and the organic (solvent) is 1:0.5 to 3, and the flow rate of DSX solvent is 550 m$^3$/hr to 1800 m$^3$/hr, and the flow rate of the feed solution is 550 m$^3$/hr to 1500 m$^3$/hr.

Further, the present invention provides a method for inhibiting extractant degradation, wherein in step (c), the concentration of zinc (Zn) is adjusted to 2 g/L to 20 g/L using zinc sulfate.

The present invention inhibits the extractant degradation by controlling the extractive capacity and preventing the direct degradation in Boleo cobalt/zinc solvent extraction (DSX), thereby increasing the extractive efficiency of the recovered cobalt and zinc.

DETAILED DESCRIPTION OF THE PREFERRED EMBODIMENT

Hereinafter, embodiments of the present invention are described in detail with reference to the accompanying drawings, which will be readily apparent to those skilled in the art to which the present invention pertains. The present invention may be embodied in many different forms and is not limited to the embodiments described herein.

Figure 1:
FIG. 1 is a flow chart of a method for inhibiting the extractant degradation according to an embodiment of the present invention.
Figure 1:
Figure 1:

FIG. 1 is a flow chart of a method for inhibiting the extractant degradation according to an embodiment of the present invention.

Referring to FIG. 1, the method of inhibiting the extractant degradation according to the present invention may be divided into the preparing step, the extracting step and the scrubbing step.

In particular, the method may include (a) the preparing step of a DSX solvent by adjusting the extractant concentration of the DSX solvent to a specific range; (b) the extracting step of metal included in the feed solution by adjusting the ratio of the organic (solvent) and an aqueous (solution) as a feed solution; (c) the scrubbing step of adjusting the zinc concentration of the solution using zinc sulfate; and (d) stripping step.

In this regard, in step (a), soda ash may be added to a sparger to adjust the pH, and in steps (c) and (d), sulfuric acid may be added to a standpipe to adjust the sulfuric acid concentration.

In step (a), the DSX solvent includes a kerosene-based compound which is a diluent, and the extractant includes an oxime-based extractant and a neodecanoic acid-based extractant.

Further, the concentration of the oxime-based extractant is adjusted to 0.5 v/v % to 6 v/v %. A volume ratio of the oxime-based extractant and the neodecanoic acid-based extractant is 1:0.5 to 4.

In step (b), when the feed solution containing the valuable metal is fed to the DSX organic (solvent), the DSX organic (solvent) and the feed solution are mixed to extract the valuable metal of the feed solution into the DSX solvent. As the feed of the DSX solvent is increased, the proportion of the mol total metal to be extracted to mol oxime of the DSX solvent can be kept low.

Accordingly, in step (b), the volume ratio of the DSX aqueous (solution) and the organic (solvent) may be 1:0.5 to 3. The flow rate of DSX organic (solvent) may be 550 m$^3$/hr to 1800 m$^3$/hr, and the flow rate of the feed solution may be 550 m$^3$/hr to 1500 m$^3$/hr.

In step (b), the extraction reaction of the valuable metal is performed according to the following reaction formula, and thus cobalt and zinc can be recovered.

$CoSO_4(aq)+R-H_2(Org) \rightarrow R-Co(org)+H_2SO_4$  [Reaction formula 1]

$ZnSO_4(aq)+R-H_2(Org) \rightarrow R-Zn(org)+H_2SO_4$  [Reaction formula 2]

$MnSO_4(aq)+R-H_2(Org) \rightarrow R-Mn(org)+H_2SO_4$  [Reaction formula 3]

The solvent in which the metal is extracted by the above reaction is stored in a loaded organic tank.

In the conventional scrubbing step, the zinc concentration is adjusted using the concentrated solution after stripping the extracted metal. When the concentration of manganese (Mn) or chlorine (Cl) in the scrubbing solution is high in the scrubbing step, a part of the scrubbing solution is bled off into the feed tank of the DSX process. When the concentrated solution is used, cobalt is also concentrated at a high concentration. Thus, when a portion thereof is bled off into the feed tank, it can overload the extractant capacity in the extracting step.

For example, when the high concentration cobalt and zinc are fed to the scrubbing step, and a portion of the scrubbing solution is bled off into the feed tank for the impurity control, the amount of metal in the extractant is high due to the high metal content in the extracting step, thereby increasing the ratio of mol total metal to mol oxime to accelerate the extractant degradation.

Therefore, in step (c), the zinc sulfate is diluted, and thus the zinc feed solution may be added. In order to control and add the zinc scrub feed solution to the scrubbing step, the zinc sulfate is diluted to have the concentration of zinc (Zn) to 2 g/L to 20 g/L, preferably 3 g/L to 15 g/L, and more preferably 4 g/L to 10 g/L.

Further, step (d) is performed to prevent degradation of the extractant due to direct contact between the additive and the solvent when adding sulfuric acid and soda ash in the DSX process.

The sulfuric acid may be added to adjust the concentration of sulfuric acid in the stripping and scrubbing steps. In order to prevent direct contact with the solvent during the addition of sulfuric acid, the sulfuric acid may be added into a standpipe and diluted with the solution, and then the mixture is contacted with the solvent rather than a conventional manner in which the sulfuric acid is directly added to the first agitator. This can prevent the sulfuric acid from directly contacting the solvent to inhibit the carbonization of the solvent.

The soda ash can be added to control the pH in the extracting step. During the addition of soda ash, the soda ash may be added using a sparger rather than a conventional manner in which the soda ash is directly added in the first agitator in the extracting step. This can prevent the soda ash from directly contacting the solvent to inhibit the carbonization of the solvent and the local increase of the pH.

Figure 2:
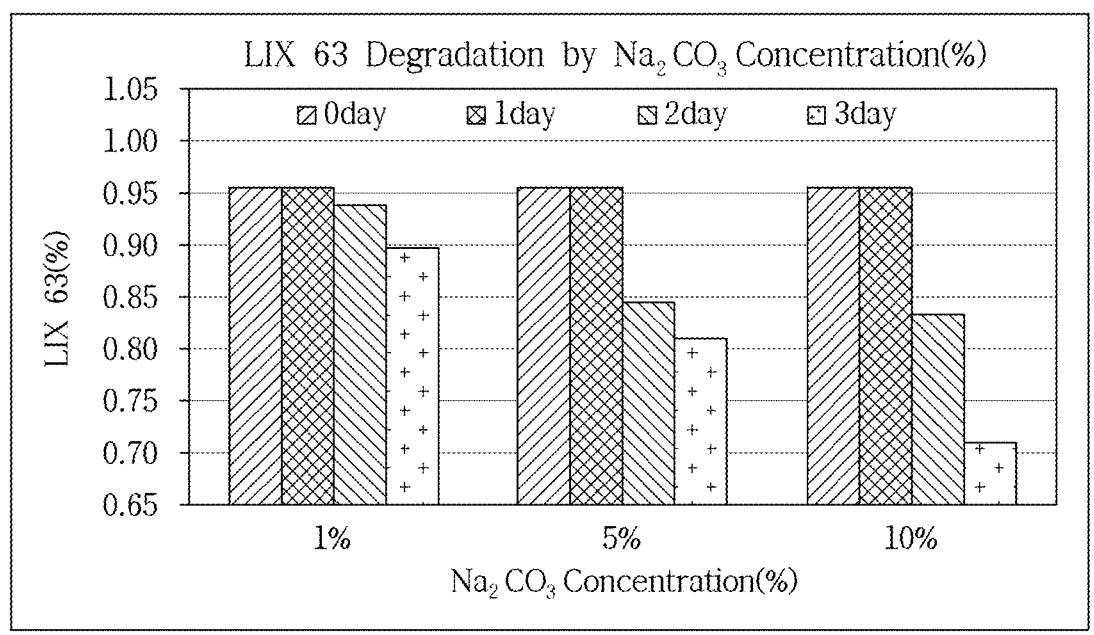
FIG. 2 illustrates extractant degradation ratios with the concentrations of soda ash according to an embodiment of the present invention.
Figure 3:
FIG. 3 illustrates the corrosion on the electrode plate due to the solution entrainment in the scrubbing step.

FIG. 2 illustrates extractant degradation ratios with the concentrations of soda ash according to an embodiment of the present invention. It can be known that as the concentration of soda ash is low, the degradation of the extractant is slowly performed.

As a result, the present invention can extend the lifetime of the extractant used in the DSX process by the above-described method for inhibiting the degradation of the extractant.

What is claimed is:

1. A method for inhibiting extractant degradation, the method including:
   (a) adjusting the concentration of extractant in a synergistic solvent extraction solvent;
   (b) mixing a feed solution and the synergistic solvent to extract metal from the feed solution into the synergistic solvent extraction solvent by adjusting the ratio of the synergistic solvent extraction solvent to the feed solution and separating the feed solution from which metal has been extracted and the synergistic solvent extraction solvent including extracted metal;
   (c) adding zinc sulfate to the feed solution from which metal has been extracted to adjust the concentration of zinc in the feed solution from which metal has been extracted; and
   (d) stripping extracted metal from the synergistic solvent extraction solvent.

2. The method of claim 1, wherein in step (b), soda ash is added to a sparger to adjust a pH of the feed solution from which metal has been extracted, and
   wherein in steps (c) and (d), sulfuric acid is added to a standpipe to adjust the sulfuric acid concentration of the feed solution from which metal has been extracted.

3. The method of claim 1, wherein the synergistic solvent extraction solvent includes an oxime-based extractant and a neodecanoic acid-based extractant in addition to kerosene, a diluent, and
   wherein the concentration of the oxime-based extractant is 0.5 v/v % to 6 v/v %.

4. The method of claim 3, wherein a volume ratio of the oxime-based extractant and the neodecanoic acid-based extractant is 1:0.5 to 4.

5. The method of claim 1, wherein in step (b), a volume ratio of the feed solution and the synergistic solvent extraction solvent is 1:0.5 to 3, and
   wherein a flow rate of the synergistic solvent extraction solvent is 550 m$^3$/hr to 1800 m$^3$/hr, and a flow rate of the feed solution is 550 m$^3$/hr to 1500 m$^3$/hr.

6. The method of claim 1, wherein in step (c), the concentration of zinc (Zn) is adjusted to 2 g/L to 20 g/L with zinc sulfate.

* * * * *